April 26, 1960 J. J. SHACKELFORD 2,934,340
FEED FOR BOX PARTITION ASSEMBLY DEVICE AND THE LIKE
Original Filed July 21, 1955 8 Sheets-Sheet 1
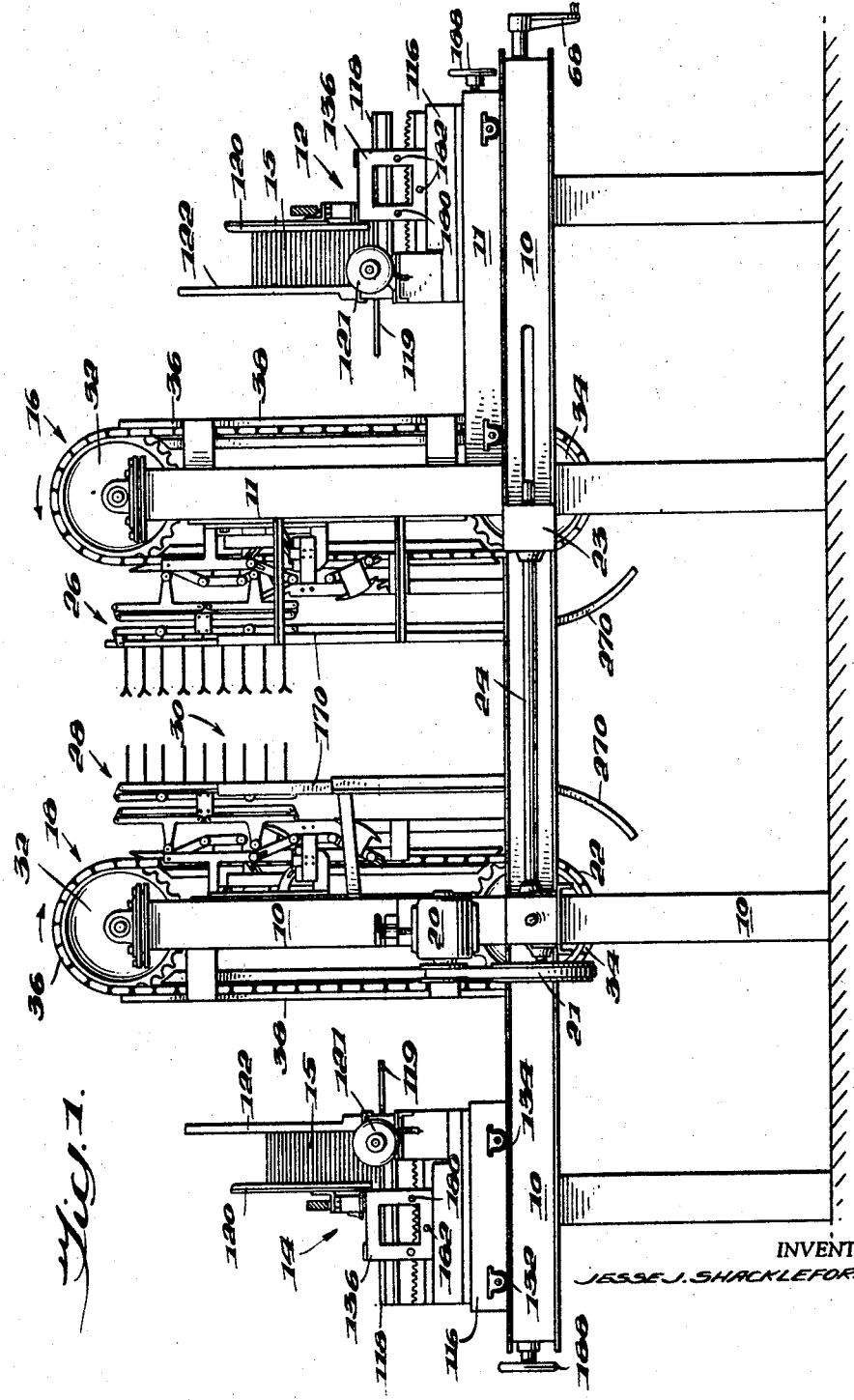
INVENTOR
JESSE J. SHACKELFORD,

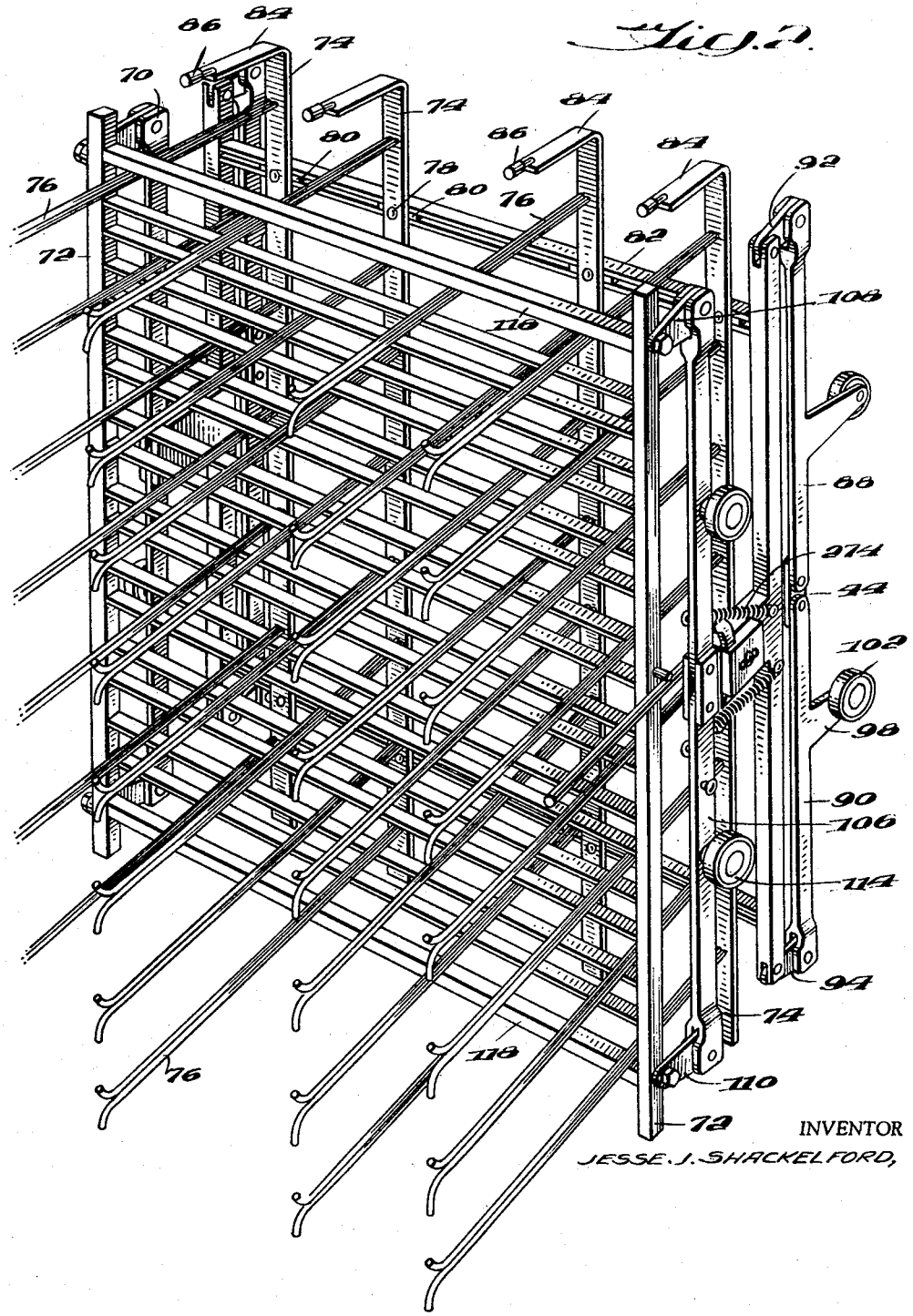

April 26, 1960 J. J. SHACKELFORD 2,934,340
FEED FOR BOX PARTITION ASSEMBLY DEVICE AND THE LIKE
Original Filed July 21, 1955 8 Sheets-Sheet 3
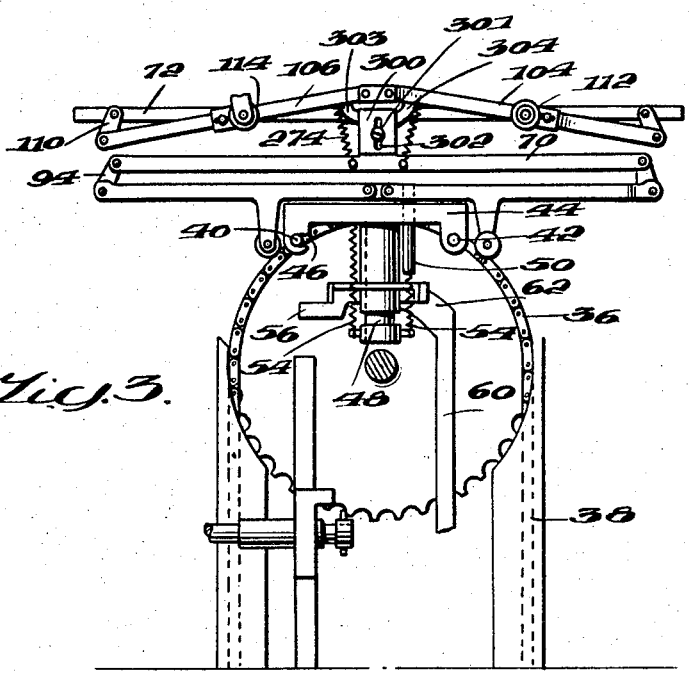
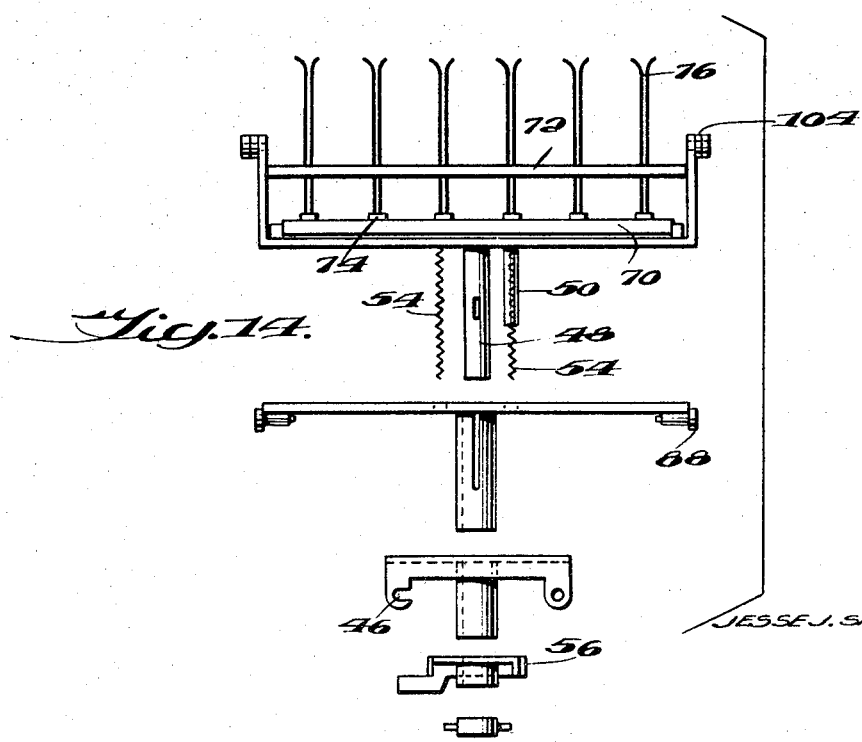
INVENTOR
JESSE J. SHACKELFORD April 26, 1960  J. J. SHACKELFORD  2,934,340
FEED FOR BOX PARTITION ASSEMBLY DEVICE AND THE LIKE
Original Filed July 21, 1955  8 Sheets-Sheet 4
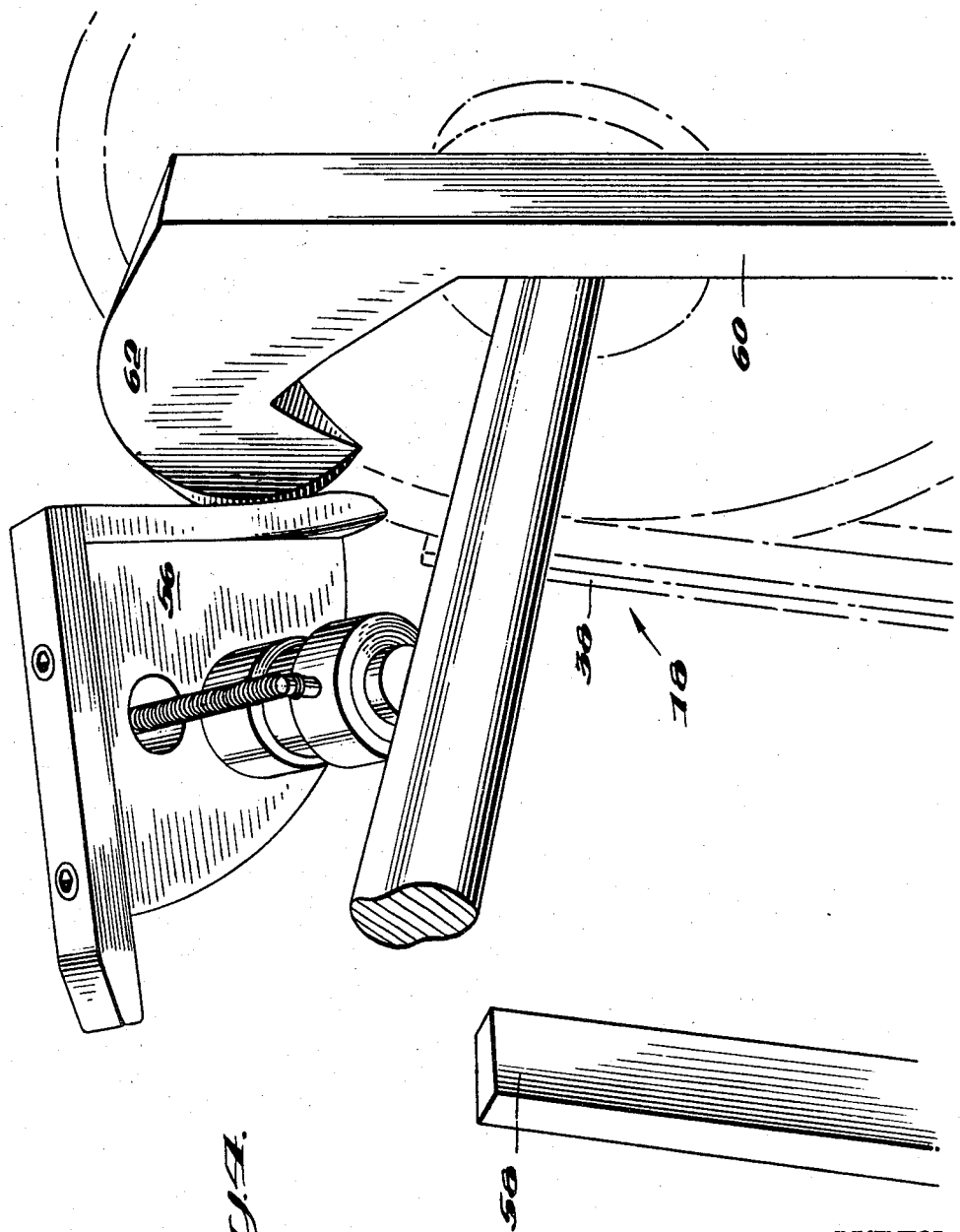
INVENTOR
JESSE J. SHACKELFORD,

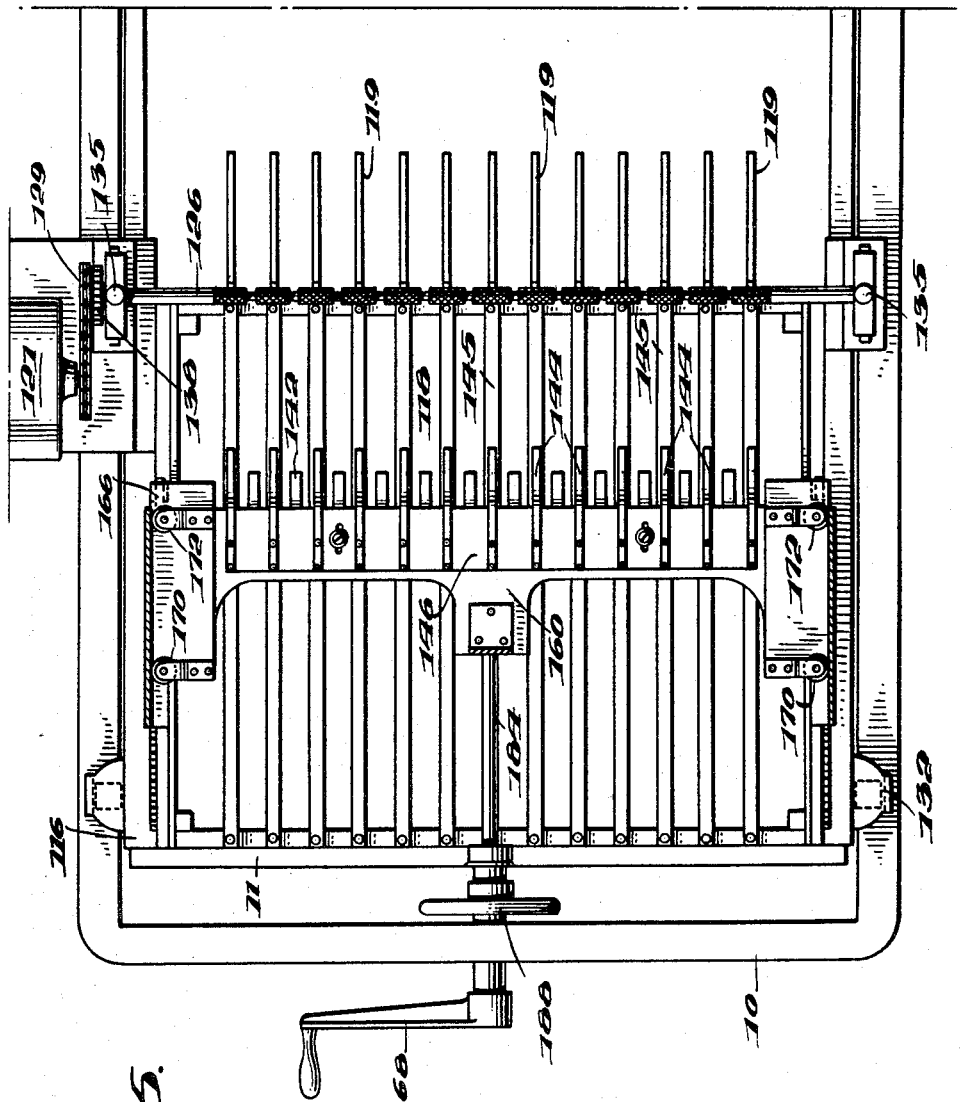

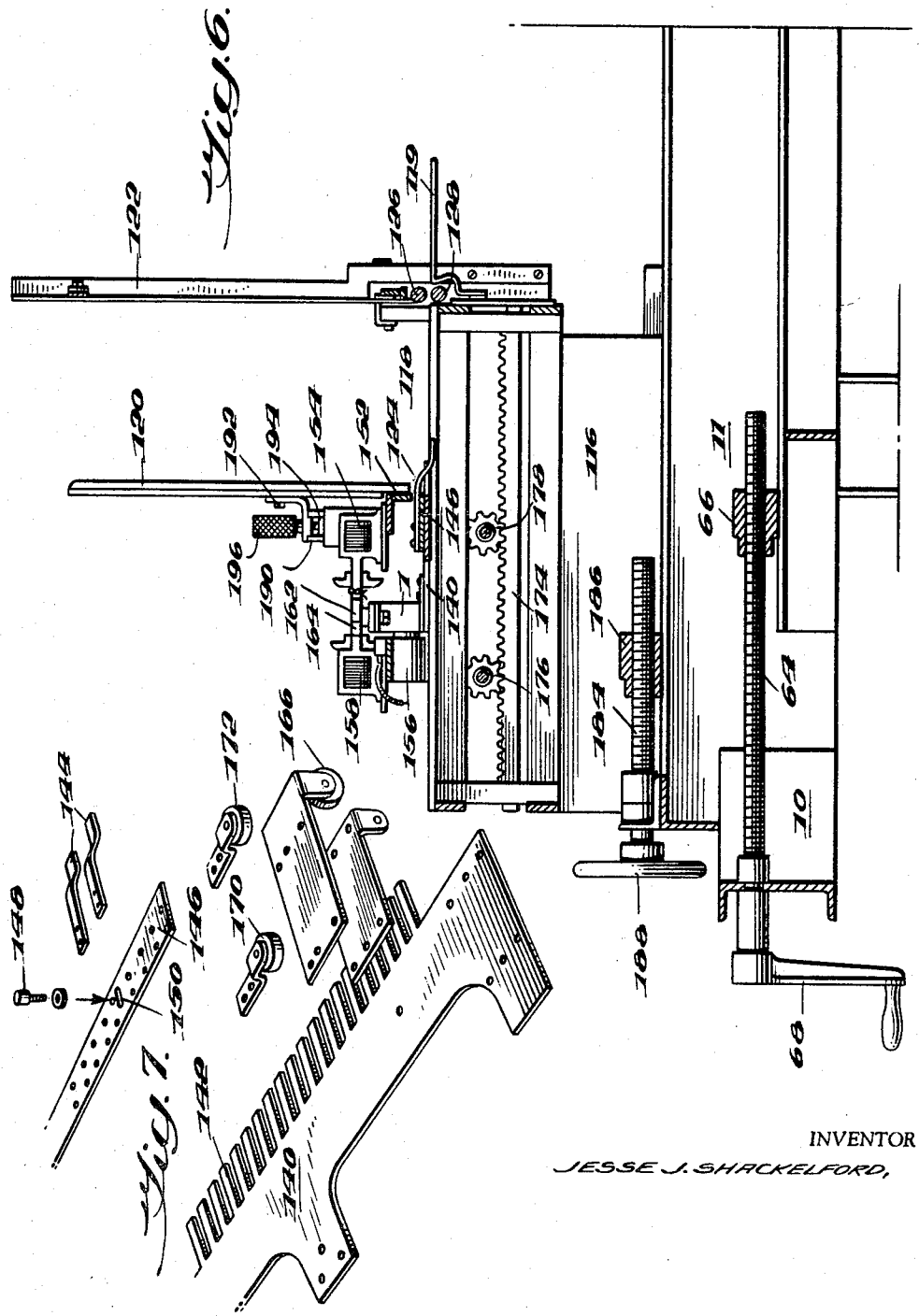

April 26, 1960     J. J. SHACKELFORD     2,934,340
FEED FOR BOX PARTITION ASSEMBLY DEVICE AND THE LIKE
Original Filed July 21, 1955     8 Sheets-Sheet 7
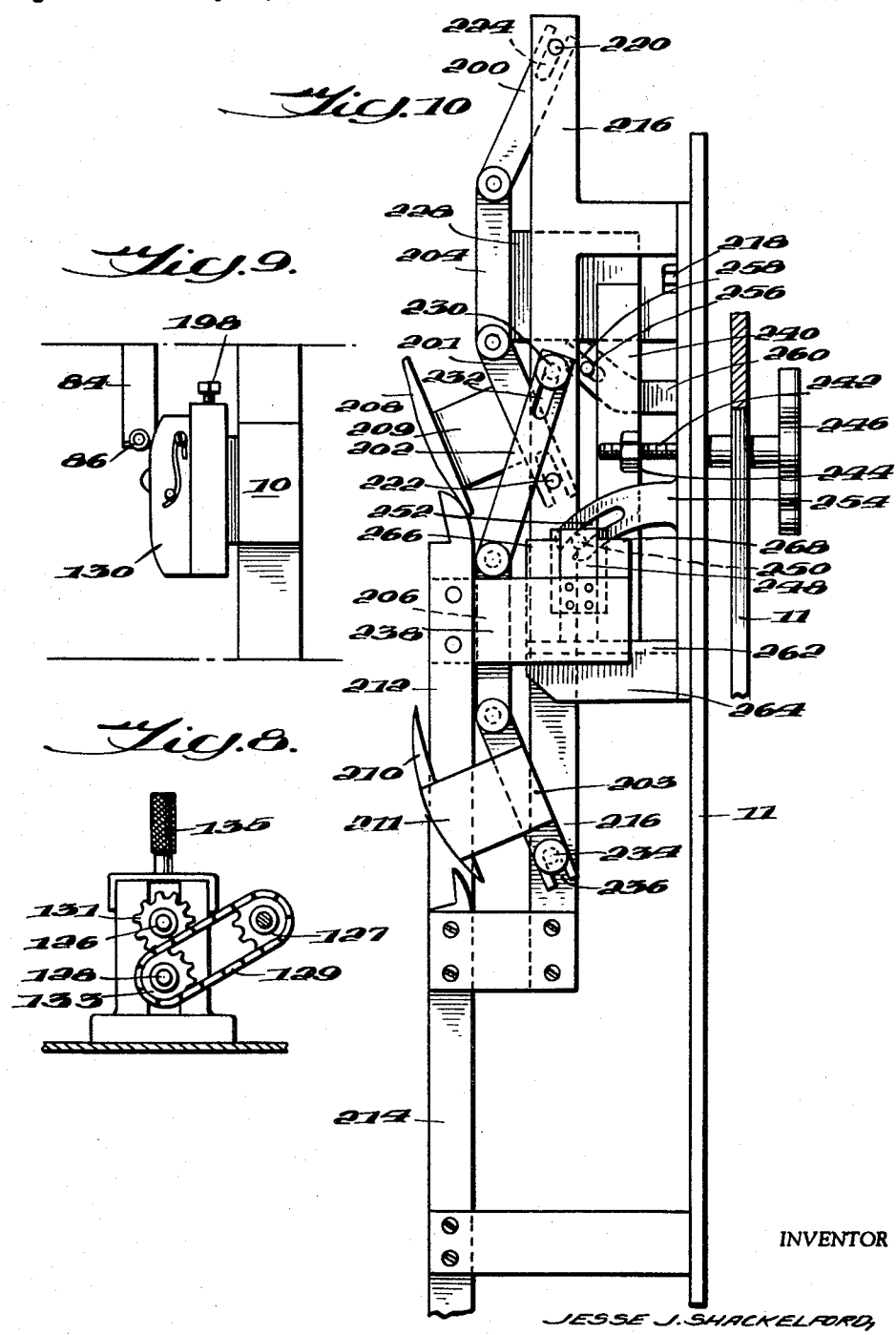
INVENTOR
JESSE J. SHACKELFORD

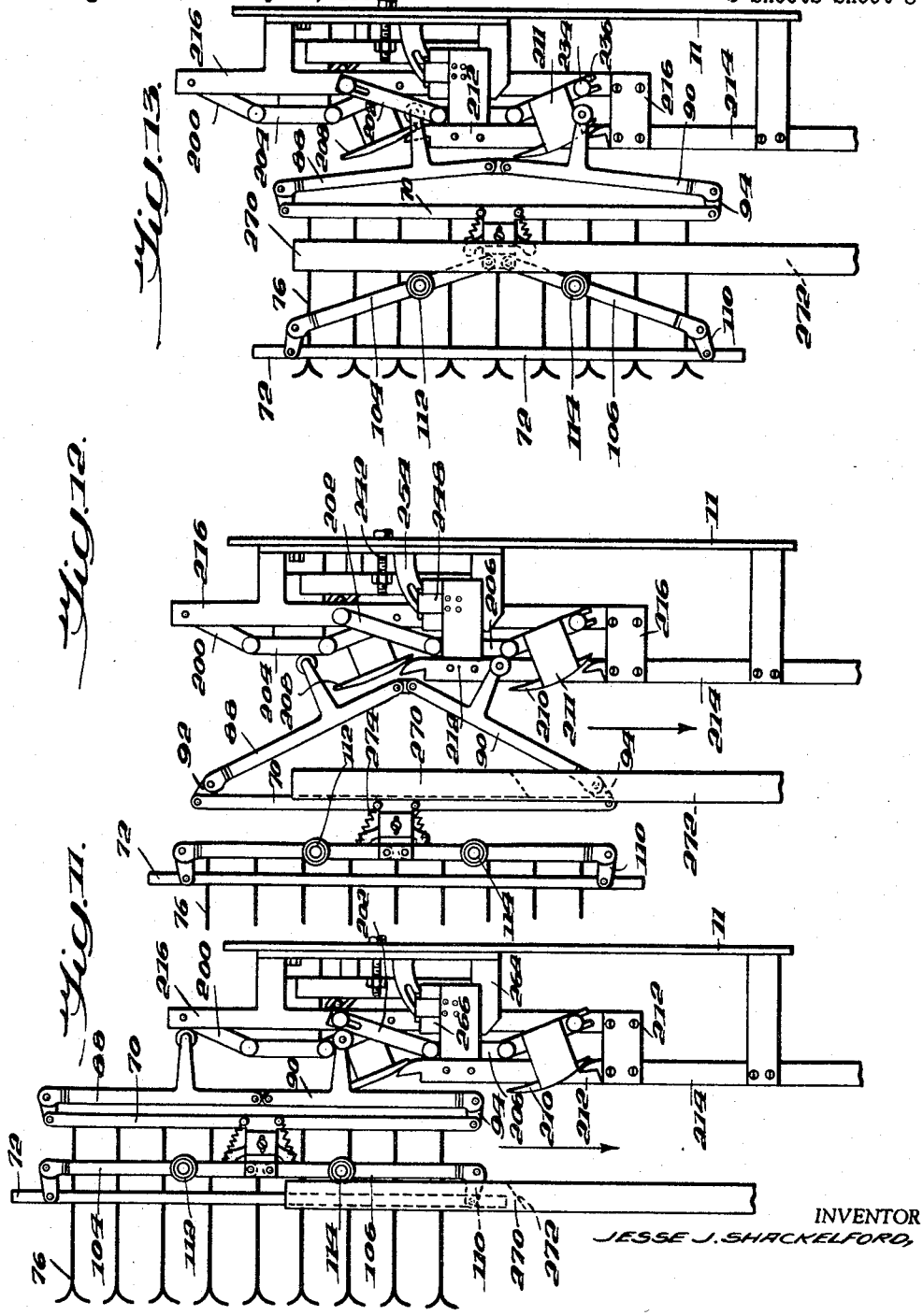

United States Patent Office 2,934,340
Patented Apr. 26, 1960

2,934,340

FEED FOR BOX PARTITION ASSEMBLY DEVICE AND THE LIKE

Jesse J. Shackelford, Fairmont, W. Va., assignor to Fairmont Box Company

Original application July 21, 1955, Serial No. 523,550, now Patent No. 2,909,104, dated October 20, 1959. Divided and this application February 20, 1959, Serial No. 796,193

8 Claims. (Cl. 271—44)

The present invention relates to the assembly of a plurality of slotted paper board box partition strips which when assembled form cells to be used in a box for holding individual bottles, jars and other more or less frangible articles.

Although there are numerous prior machines intended to serve the purpose of assembling partitions of this type, the box industry generally continues to assemble a high percentage of its partitions by hand, thereby materially increasing the cost of the operation. One reason for this is the lack of flexibility of the prior machines. The box industry works on a custom basis, rather than on standard box sizes, and it follows that any thoroughly practical machine for this industry must be capable of almost infinite adjustability. It is primarily in this respect that the prior art has failed to produce a really satisfactory partition assembly device.

It is an object of the present invention to provide a partition assembly device having a high degree of adjustability enabling it to handle a wide range of slotted partition strips for making assorted sizes and varieties of box cells.

It is another object of this invention to provide a new method of bringing individual slotted partition strips into assembly, together with new apparatus for carrying out the method.

Another object of the invention is the provision of feed means for supplying individual partition strips to moving strip holders. It is also an object of the invention to provide movable strip holders which signal for a strip in timed relation to their movement.

Other objects of the invention will be more readily apparent from the following description and the attached drawings.

In general, the invention comprises a frame mounting, a pair of identical feed assemblies at each end thereof, a pair of operatively opposing conveyor assemblies, each spaced between one feed assembly and the center of the frame, for receiving partition strips from a feed assembly and transporting them from a feed station to an assembly station between the conveyors at about the center of the frame, means for moving said strips on one conveyor to a position at right angles to the strips on the other conveyor, and means operatively associated with each of said conveyors for assembling said strips as they are traveling past the assembly station on their respective conveyors.

Each conveyor is driven at the same speed and is provided with a plurality of opposed strip holding racks having individual spaced strip holders for receiving strips from the feed assembly, each rack on one conveyor having individual strip holders for a number of strips equal to the number of strips required for all the parallel strips adapted to extend in one direction in an assembled cellular partition unit and each rack on the other conveyor having individual strip holders for a number of strips equal to the number of parallel strips adapted to extend in the other direction in the assembled unit.

One feature of the invention is the adjustable and removable mounting of the individual strip holders on the rack whereby a desired number of holders may be used and the spacing of the strip holders on the racks of each conveyor may be spaced to correspond to the spacing of the slots in the strips held on the racks of the other conveyor. Another feature of the invention is the provision of a feeler on each individual strip holder to enable it to call for a strip at the proper time.

Another feature of the invention is the dual conveyor system which permits strips to be continuously fed to strip holders at feed stations on one side of each conveyor while the strips are continuously assembled at an assembly station between the conveyors on the sides opposite the feed stations.

Another feature of the invention is the adjustable feed assembly, and this feature takes several separate forms. Each entire operative feed assembly may be manually shifted towards and away from its conveyor to adjust for different height of strips; each feed assembly includes feed rolls and a reciprocating feed block which may be spaced apart a predetermined distance by manually operable means to further adjust for different height partitions; the bite of the reciprocating blade may be adjusted to accommodate strips of different thickness; and a guide may be adjusted to control the lateral position of the strips in assembly and to permit the machine to assemble a plurality of partition units in side by side relationship.

Still another feature of the invention is the adjustability of the conveyors. This is accomplished by the provision of slide means between one conveyor and the frame whereby one conveyor with its feed assembly may be shifted towards and away from the other conveyor to adjust for different height partitions.

Other features of the invention include the means for assembling the strips during their movement past the assembly point. Such features are means for turning the racks on one conveyor 90° with respect to the racks on the other conveyor, preferably by a cam between the feed station and the assembly station; means for shifting moving opposing conveyor-carried racks towards one another at the assembly station for assembling the partitions, preferably by cam means adjacent the path of the racks past the assembly station; means for adjusting the degree of movement of said racks to accommodate strips of varying height, preferably by an adjustable cam track; and means for stripping strips from the holders after they have been assembled, preferably by cam means positioned in the path of the rack adjacent the assembly station.

Another feature of the invention is the feed assembly for feeding strips to a moving conveyor by the combination of high speed feed rolls and a solenoid activated reciprocating feed blade or push bar.

Other features of the invention include the novel combinations more fully described in the following specification and the attached drawings.

The invention will be better understood by reference to the drawings, in which:

Fig. 1 is a side elevation of a preferred form of a partition assembly device constructed in accordance with the present invention;

Fig. 2 is a detailed perspective view of a strip holding rack illustrating the rack structure without the base therefor.

Fig. 3 is a partially diagrammatic view, partly in section, partly in elevation, illustrating the attachment of the racks to the conveyors.

Fig. 4 is a broken perspective view showing a rack turning cam operatively engaged by a cam follower for rotating a rack about a 90° angle.

Fig. 5 is a plan view of the preferred feed assembly used in the present invention.

Fig. 6 is a detailed view of one end of the machine illustrated in Fig. 1, partly in elevation and partly in section.

Fig. 7 is an exploded perspective illustrating the reciprocating blade portion of the feed assembly.

Fig. 8 is a detailed side elevation showing a part of the feed roll drive.

Fig. 9 is a detailed side elevation illustration of the operation of the switch for activating the reciprocating blade of the feed assembly.

Fig. 10 is a detailed side elevation showing the adjustable cam tracks for moving the strip holding racks and assembling the partitions at the assembly station.

Figs. 11, 12 and 13 diagrammatically illustrate the sequential operation of the rack assembly in assembling partition strips and stripping the assembled strips from their holders.

Fig. 14 is an exploded view of a rack mounting assembly as shown in Figure 3.

GENERAL DESCRIPTION

Referring now to the drawings, and particularly to Fig. 1, it will be seen that a frame 10 mounts a sub-frame 11 which in turn mounts a feed assembly indicated generally at 12 at one end, and a feed assembly indicated generally at 14 is mounted on frame 10 at the other end thereof. The frame 10 mounts conveyor assembly 16 while sub-frame 17 mounts an opposed conveyor assembly 18. Both conveyors are driven at the same speed by a single electric motor 20 working through belt 21, gear boxes 22 and 23 and a splined shaft 24 which permits adjustment of the relative longitudinal positions of frames 10 and 11 without changing their relative speeds. Suitable control switches are provided for starting and stopping the motor either by manual activation or by suitable automatic stop means responsive to improper operation. A speed change device, not shown, is operatively associated with the driving means for permitting an operator to manually control the speed of the conveyors and thus the speed of the operation of the machine.

Conveyor 16 carries a plurality of rack assemblies, only one of which is shown by being indicated generally at 26, and conveyor 18 carries a plurality of rack assemblies, only one of which is shown by being indicated generally at 26. For every rack 26 on conveyor 16 a corresponding rack 28 is mounted on conveyor 18, and the two racks are always operatively opposed in their movement past the assembly station, which is really an imaginary area indicated generally at 30. Any number of racks which can be carried by the conveyors may be mounted thereon without interfering with the operation of the machine. It has been found that six racks on each conveyor is a suitable number for ordinary operation.

Conveyors

Conveyors 16 and 18 are generally identical in that each has a pair of rotatable upper wheels 32 and a pair of positively driven lower wheels 34 with respective pairs of wheels 32 and 34 connected by link chains 36. Each set of wheels 32 and 34 is mounted on frame 10 and sub-frame 11 by suitable shafts which are journaled on the frames by bearing means. The conveyor also includes suitable chain guides as at 38 and means for supporting the racks thereon, as will be more readily understood by reference to Fig. 3. Each pair of chains 36 carry a plurality of pairs of cross rods 40 and 42 for mounting the racks on the conveyor. A base 44 for each rack is mounted on each pair of cross bars by means of a hole for rod 42 and a slot 46 for rod 40. The slot provides an adjustment enabling the base to negotiate the turns at the wheel ends of the conveyor. Each base 44 is provided with holes by means of which it slidably mounts an axle 48 and a guide pin 50 mounted on the rack frame 70 extending through said holes. Frame 70 supports strip holders 74, not shown in Fig. 3, but fully illustrated in Fig. 2. Tension springs 54 normally bias each rack 70 towards each base 44. The axles 48 on conveyor 16, not shown, are non-rotatably mounted on base 44, but the axles 48 on conveyor 18, illustrated in Fig. 3, are rotatably mounted on base 44, and the position of the rack is predetermined by cam means. This cam means includes cam follower 56, illustrated in Fig. 3 and in Fig. 4, keyed on axle 48 and cams 58 and 60, which form a track for guiding cam follower 56 during the movement of the racks along the vertical runs of the conveyor, thus stabilizing the racks in their movement past the assembly station 30 and the feed assembly 14. In Fig. 4 it will be seen that a turning cam 62 is provided for rotating each cam follower 56 and its rack at a 90° angle for bringing the strips on the racks of conveyor 18 into proper alignment for assembly at right angles to the strips held in an opposing rack on conveyor 16. A turning cam, not shown, similar to cam 62, is provided at the bottom of cam 58 for engaging cam follower 56 and rotating the racks 28, 90° back to a plane appropriate for operative relationship with the feed assembly.

Conveyor 18 is fixed directly on frame 10, but conveyor 16 and feed assembly 12 are mounted on a sub-frame 11 (Fig. 1 and Fig. 6) which in turn is slidably mounted on frame 10 to provide longitudinal adjustment of the respective spacing between the two conveyors to accommodate partitions of different height. The two frames may be manually shifted by means of screw 64, which is journaled in frame 10 and threadably engaged in a bolt block 66 mounted on frame 11. Proper leverage is secured through a crank 68.

Strip holders and racks

Referring now to Fig. 2, it will be seen that a typical rack 28 is mounted on a rack base 44 by a toggle linkage, the arms of which are provided with cam followers operative in the assembling operation, as will be described below. Each rack includes a rack frame 70, a stripper frame 72, and means for moving the rack frame 70 with respect to the rack base 44 and the stripper frame 72 with respect to the rack frame 70. A predetermined number of individual strip holders 74, each provided with a plurality of strip holding fingers 76, are mounted in any desired spacing on frame 70 by means of screws 78 operatively engaged with sliding bolt blocks 80 mounted in cross channels 82 which form a part of the frame.

Racks 26 are identical to racks 28 in the respects just described, and the racks 26 are moved in their assembling and stripping operations by mechanisms identical with those of racks 28 with the sole exception that the toggle linkages of racks 28 extend parallel to the individual strip holders, whereas in racks 26 they extend at right angles to the strip holders. Racks 26 are not illustrated in separate detail.

Thus, in setting up the machine, one mounts on the rack frames 70 of conveyor 16 a plurality of strip holders 74 corresponding in number and in spacing to the number and spacing respectively of the slots in the strips to be carried by the racks of conveyor 18 in the particular operation to be carried out. In the same setup operation, a plurality of individual strip holders 74 will be mounted in the rack frames 70 for conveyor 18, corresponding in spacing and number to the slots of the partitions to be held in the racks of conveyor 16.

It will be noted that each strip holder 74 is provided with an arm 84 and a roller feeler 86 to signal for strips at the feed station. This operation will be described in more detail in connection with the feed assembly.

The mechanism for shifting the rack frame 70 and the stripper frame 72 in the assembling and stripping operations comprise identical linkages at each side of the frame, activated by identical cam tracks at each side of the frames 10 and 11 adjacent the vertical runs of the conveyors on the assembly side. For convenience, only one side of one rack is described. A pair of toggle arms 88 and 90 are each pivotally connected at one end to base 44, and pivotally connected at their other ends, respectively, to links 92 and 94, which in turn are pivotally connected one at each end of frame 70. Each arm 88 and 90 is provided with a bracket 96 and 98, respectively, carrying cam follower rolls 100 and 102. It will be noted that roll 100 is on one side of its bracket 96, while roll 102 is on the opposite side of its bracket 98, so that each of these rolls may engage separate parallel cam tracks without one interfering with the other. In operation, the two cam tracks force the toggle linkages to move forward and to the left in Fig. 2 for shifting the rack frame 70 of one conveyor into operative engagement with the rack frame 70 of the other conveyor.

Another toggle link includes a pair of arms 104 and 106 pivotally connected at one end to a bracket on frame 70, and at their other ends to links 108 and 110, respectively, connected one to each end of strip frame 72. Arm 104 carries a cam follower roll 112, and arm 106 carries a cam follower roll 114. It will be noted that roll 112 is laterally offset a little more than the width of roll 114, so that these rolls may engage parallel separate cam tracks without one interfering with the other. In operation, these rolls engage cam tracks after the partition strips have been assembled to force strip frame 72 away from rack 70 as the latter is retracted so that cross bars 118, provided on frame 72, will remove the individual strips from fingers 76, thus leaving the assembled partitions free to fall beneath the assembly station.

Feed assemblies

The feed assemblies 12 and 14 are generally identical in their structure and operation, the only difference being in the detail of the mounting structure occasioned by the difference in frames 10 and 11 required for conveyor adjustment. Each feed assembly has a feed base 116, slidably mounted on frame 10, in the case of feed 14, and on frame 11 in the case of feed 12. Base 116 of assembly 14 is provided with rollers 132 and 134 for ease of adjustment, and equivalent rolls may be used in assembly 12, although only a slideway is illustrated.

Base 116 carries all the operating parts of each feed assembly, including a feed table 118, a front strip guide 122, a horizontal guide or table extension 119, a pair of feed rolls 126 and 128 and a driving motor 121, all fixed thereon and movable therewith. In Fig. 8, it will be noted that motor 121 has a pinion 127 that drives the feed rolls 126 and 128 through pinions 131 and 133 mounted thereon and a chain 129. A hand screw 135 controls the pressure between the rolls 126 and 128 through resilient means not shown.

The base 116 also carries a solenoid-activated reciprocating feed bar sub-assembly, which includes a reciprocating feed bar 124, a rear strip guide 120 and feed bar operating structure all mounted on a feed bar frame 136. This frame is, in turn, slidably mounted on feed base 116.

The reciprocating feed bar sub-assembly includes a solid base bar 140 provided with a plurality of push elements 142 and a plurality of bite-controlling fingers 144 mounted on a control bar 146. This assembly forms an important feature of this invention in that it provides a simple and handy adjustment for adapting the machine for use with partitions of different thicknesses. Control bar 146 is mounted on base bar 140 by means of bolts 148 in slots 150. The free ends of fingers 144 ride in grooves 145 of table 118, and, by varying the longitudinal position of the control bar, the fingers 144 are extended or retracted with respect to the pusher elements 142. This varies the bite of the pusher elements 142, because the distance from the top of the pusher elements to the fingers is a function of how far the fingers are extended. In operation, the fingers 144 ride back and forth beneath the stack, and pushing is accomplished only by the exposed shoulders of the pusher elements 142, the vertical dimensions of which are adjusted as described above.

A cross bar 152 mounts three solenoids, only one of which is shown at 154, for moving the feed bar 124 to force a strip from under the stack into a holder. Cross bar 156 mounts a solenoid 158 for retracting the feed bar. An armature 160 has fingers, only one of which is shown at 162, positioned for movement in response to activation of solenoid 154, and a finger 164 positioned for movement in response to solenoid 158. The armature 160 is connected to the feed bar 124 through its base bar 140, and they move with it and are reciprocated thereby. Each end of the feed bar 124 is supported on the feed base 116 by a horizontally axled roller 166 at each end thereof and by vertical axled rollers 170 and 172 positioned at each end thereof. Appropriate brackets are provided for mounting the rollers on the base bar 140 of bar 124.

The reciprocating feed bar sub-assembly may be manually moved backwards and forwards on base 116 to provide an adjustment to accommodate strips of different height. This varies the distance between guides 120 and 122 and between the reciprocating feed bar 124 and the feed rolls 126 and 128. Movement of the sub-assembly is accomplished by a rack 174 fixed on base 116 and two pinions 176 and 178 mounted on shafts journaled in the feed bar frame 136. The end of one shaft, illustrated at 180 in Fig. 1, extends out of the frame and is provided with a square head to receive an auxiliary handle for rotating the pinions. A set screw 182 fixed the sub-assembly in any desired position of longitudinal adjustment.

The other feed assembly adjustment for partitions of different height has been briefly discussed above. It includes means for shifting each entire feed assembly longitudinally relative to its conveyor, so that the distance between the feed rolls 126 and 128 and the strip holding fingers 76 may be varied. This is accomplished by a screw 184 journaled in frame 10 or 11, as appropriate, and threaded in bolt block 186 mounted on feed base 116. A hand wheel 188 is provided for rotating the screw.

The feed assembly is provided with one further important adjustment; namely, means for adjusting the lateral position of the strips so that they will be fed in an appropriate position for assembly. This is accomplished by means for shifting guide 120 laterally along the reciprocating feed bar sub-assembly and these means include a cross channel 190 mounted on cross bar 152, a bracket 192 mounted on the guide 120, a sliding bolt block 194 mounted in the channel 190, and a hand screw 196 journaled in bracket 192 and threaded into bolt block 194. One or several guides 120 may be thus mounted on the feed bar sub-assembly, the number of strip guides corresponding to the number of partitions to be simultaneously assembled in side by side relationship.

A microswitch 130 is mounted on frame 10 so that its activating element is just below the level of the bite of feed rolls 126 and 128. This switch is connected by means not shown to the solenoids 154 and 158, so that depressing the switch activates solenoid 154 to move the feed bar in a forward feeding direction, and release of the switch activates solenoid 158 to retract the feed bar. The microswitch is actuated by feeler roll 86 of each strip holder 74 at the instant it is in position to receive a strip. A further adjustment is provided for the microswitch in the form of a screw 198 for raising and lowering the position of the microswitch relative to the bite of rolls 126 and 128 in the event that the conveyors are speeded to an extent that it interferes with the synchronization of the feed mechanism.

In operation, a stack of strips 15 is supported on table 118 with one side against front guide 122 and the slotted side against guide 120. One slot of each strip is astride forward portion of guide 120 to control the lateral position of the strips. On signal from microswitch 130 by a strip holder 74 (through feeler 86) the feed bar 124 kicks the bottom strip from the stack 15 into the bite of rolls 126 and 128 which are continuously rotated at a high speed of about 1700 revolutions per minute by a separate motor 121. These actions are so synchronized that the strips are instantaneously slipped into the appropriate moving strip holders.

Strip assembly actuation

The cam track for controlling the assembling motion of each rack frame 70 is illustrated in Figs. 1, 10, 11, 12 and 13, and the detail will be best understood by reference to Fig. 10. There are 8 cam tracks provided on the machine, one on each side of each conveyor for each roll 100, and one on each side of each conveyor for each roll 102. In the views illustrated in Figs. 10 to 13, one pair of cam tracks at one side of the machine for one set of rolls 100 and 102 is illustrated. In operation, as a rack 28 moves downward past the cam tracks shown in Fig. 10, roll 100 first engages the forward face of arm 200, and at the same instant, roll 102 engages the forward face of element 202. Then roll 100 rides up onto the forward face of link 204 and at the same instant, roll 102 rides up on the forward face of link 206. As roll 100 leaves the face of link 204, it is engaged on its opposite side by the rear face of cam 208, and, in a similar fashion, roll 102 comes under the influence of the rear face of cam 210. Roll 100 is thereafter controlled by the rear face of cam bar 212, and roll 102 is controlled by the rear face of cam bar 214. In any given operation, these are the only cam elements which control the assembly movements of the racks, but for every separate assembly operation, the cam track must assume a position adapted to the height of partitions being assembled.

The structure to be described now enables an operator to make suitable adjustments of a pair of cam tracks by turning a single hand wheel. In considering this description, it should be kept in mind that cam bars 212 and 214 are fixed on either frame 10 or 11, as appropriate, and no adjustment of these elements is required.

All the adjustable cam structure is mounted on a vertical supporting bracket 216 fixed on frame 11 by means of bolts, as at 218. The cam elements for controlling the movement of roll 100 include what may be termed a cam toggle assembly, having a pair of arms 200 and 201 pivotally connected at their inner ends to a center link 204, with their outer ends articulated on studs 220 and 222 riding in slots 224 and 226, respectively. Center link 204 is mounted on a block 228, which is mounted by a horizontal slide on bracket 216. Cam 208 is carried on arm 201 by a bracket 209.

It will be noted that the cam track for roll 100 is laterally offset from the cam track for roll 102, the former being illustrated as behind bracket 216, and the latter in front of bracket 216. This permits independent operation of the two cam tracks for a cooperative effort. The cam track for roll 102 is similarly constructed with a cam toggle, including a center link 206, arms 202 and 203, the latter carrying cam 210 on bracket 211. The outer end of arm 202 is mounted on stud 230, which rides in a slot 232, and the outer end of arm 203 is held on stud 234 by a slot 236. Likewise, link 206 is mounted on horizontally sliding block 238. Blocks 228 and 238 are each connected to a control bar 240, by means to be described, for moving them horizontally to thereby control the degree of horizontal movement which will be imparted to the racks in the assembling operation. This horizontal movement is manually controlled by a screw 242 journaled in frame 11 and threaded into bolt block 224 fixed on control bar 240. A hand wheel 246 is provided for operating the screw.

As the cam toggle assemblies are horizontally shifted to provide a greater movement of the racks in the assembling operation, it will be noted that the points in which the rolls 100 and 102 engage the cams 204 and 206 will be moved closer together. To accommodate for this difference and to cause these rolls to engage their respective cams at the same instant, means are provided for shifting the adjustable portions of each cam track away from one another as they are moved forward and away from their frame support. This means is operable through the structure connecting the sliding blocks 228 and 238 with the control bar 240. The structure is identical for both cam tracks, but in Fig. 10, only the adjustment for the cam acting on roll 102 is shown in complete detail, as the structure for the cam acting on roll 100 is on the back side of the illustration and not visible in these views. Block 238 is riveted and fixed on a vertically sliding block 248, which has a laterally projecting stud 250 extending into a cam slot 252 on a bracket 254 mounted on frame 11. Corresponding structure for the other cam track can be seen in a stud 256, a slot 258 and a bracket 260. Control bar 240 has at its lower end a sliding element 262 which slides in a track on bracket 264 which is fixed on frame 11. A pair of slide fingers 266 and 268 extend upwardly from element 262 and define a vertical slide path for slide 248.

Thus, in adjusting the cam structure, one need merely turn hand wheel 246 to the right or to the left, as may be appropriate, and control bar 240 will thus be shifted horizontally. In this movement, slide fingers 266 and 268 will be shifted horizontally, as will corresponding structure for the other cam track. They, in turn, shift slide 248 and its corresponding slide horizontally, and these slides receive a vertical component of motion imparted by the angle of cam slots 252 and 258. Accordingly, as slide 248 is moved in both a horizontal and a vertical direction, slide block 238 will be shifted both vertically and horizontally, as will link 206. It will also be seen that arms 202 and 203 are free to adjust by virtue of their slots 236 and 232, mounting them on studs 234 and 230, respectively. Corresponding action on the other cam track achieves a similar result.

Stripping

After the strips have been assembled, the racks 70 are withdrawn by the action of cam faces 208 and 210; and as they are withdrawn, stripping frame 72 pushes the assembled strips out of fingers 76 by means of its cross bars 118. Referring to Figs. 11 through 13, it will be seen that a pair of vertical cam bars 270 and 272 are positioned at each side of the frames 10 and 11 adjacent the path of the racks, just beyond the assembly station, for cooperative action with rolls 114 and 112, respectively, for accomplishing the effective action of the stripping frame. The two vertical cam bars are fixed to one another in a parallel offset relationship, so that each acts on one of the correspondingly offset wheels 112 and 114 independently of the other. Thus, in Figs. 11 and 12, it will be seen that the stripping mechanism is completely inoperative, whereas in Fig. 13, rack 70 has been withdrawn, and roll 112 is raised on cam 270, while roll 114 rests on cam 272 to hold stripping frame 72 in an extended position for stripping action. A pair of springs 274 extending between frames 70 and 72 retracts the stripping frame after it leaves the influence of cams 270 and 272 at the bottom of the conveyor track.

To maintain proper alignment of the stripping frame 72 there is a guide pin 273 extending from frame 70 and it is operatively engaged by a stud 75 mounted on frame 72 (Fig. 2).

The stripping frame also serves as a stop for limiting the depth to which slotted partition strips may be inserted in the strip holders 76. For this reason its position may be adjusted to accommodate strips of varying height. The adjustment means include a stop arm bracket 300 (Fig. 3) at each side of each frame 70. The bracket is held on the frame by a screw extending through a slot 302 whereby the bracket may be raised or lowered. A pair of stop arms 303 and 304 mounted on bracket 300 engage the underside of arms 106 and 104 respectively to predetermine the rearmost position of the strip frame 72 in accordance with the adjusted position of bracket 300.

General operation

After setup, to operate the machine, appropriate switches are then thrown to start feed motors 121 and to activate microswitches 130. A switch is then thrown to start motor 20 for driving conveyors 16 and 18 (Fig. 1).

As racks 26 and 28 are transported past feed assemblies 12 and 14, respectively, roll 86 of each strip holder will engage a microswitch 130, thereby causing the reciprocating feed bars 124 (Fig. 6) each to shift a single strip from the bottom of a stack 15 into the bite of rolls 126 and 128. These rolls grasp the strip and force it quickly into the fingers 76 (Fig. 2) of the strip holder 74 carrying the same roll 86 which depressed the microswitch. The strips are guided by guides 119 into the proper position to engage the holders. This action is repeated at both ends of the machine, so that every strip holder on every rack passing the feed assemblies is provided with a properly aligned strip, one after the other automatically. After the racks receive the strip holders, they are transported upwardly on the conveyors, over the top, and thence downwardly past the assembly station 30.

However, as rack 28 moves over the top of conveyor 18, it is rotated about an angle of 90° by cam 62 (Fig. 4) acting on cam follower 56 operatively connected with the base of the rack 28. Each rack 28 is turned in a similar manner to present the strips carried thereon at right angles to the strips carried on the racks 26.

As a pair of opposing racks 26 and 28 are conveyed past assembly station 30, they are moved towards one another (Figs. 11–13), so that their slotted portions mesh to effect assembly of the partitions. As soon as assembly is completed, the racks 70 are withdrawn, but the stripper frames 72 are held extended to remove the partition strips from the fingers 76, thus leaving them meshed and assembled. The action of the means for effecting the assembling and stripping operations may be seen in proper sequence in Figs. 11, 12 and 13. After assembly is complete, racks 26 and 28 pass downwardly and around the bottom of the conveyors back to the feed stations. However, as rack 28 passes around the bottom of conveyor 18, a cam corresponding to cam 62 rotates the rack 90° to a proper feed position. Thus, a plurality of racks on each conveyor are being continuously fed on one side of the conveyor and assembled on the other side.

A conveyor (not shown) is provided beneath the assembly station for removing assembled partitions for packaging and shipping.

The operation of the machine may be speeded or slowed by speed-control means without changing the nature of the operation.

Details of the various operations have been further explained in connection with the description of the specific structure involved.

Setup

To set up the machine for operating on different size partitions, several adjustments must be made, although not necessarily in any particular sequence.

To adjust for partitions of different height, one must make the following changes:

(a) Adjust the spacing between conveyors 16 and 18 by turning crank 68 to move frame 11 on frame 10, thereby adjusting the relative positions of each entire end of the device.

(b) Adjust the distance between feed bases 116 and the conveyors by turning hand wheel 188 at each end of the machine.

(c) Adjust the distance between guides 120 and 122 by turning the pinions 178 through shaped shaft 180 at each end of the machine. This adjustment shifts frame 136 on base 116.

(d) Adjust the cam tracks on each side of each conveyor by turning the four hand wheels 246. This causes the racks to move towards one another an appropriate distance for assembly.

(e) Adjust the positions of brackets 300 to properly position racks 72, thereby limiting the depth to which strips will be fed into holders 76.

To adjust the machine for different spacing of the slots in the strips and likewise for a different number of strips in each assembled partition, one must make the following changes:

(a) Place on each rack 70 a number of strip holders 74, equal to the number of strips to go into one side of one assembled partition, or to a multiple of that number if several partitions are to be assembled simultaneously in side by side relationship.

(b) Space the strip holders 74 in cross bars 82 a distance equal to the distance between the slots in the strips to be held on the opposing racks of the other conveyor.

(c) Adjust the lateral position of guide 120 on cross channel 190 by means of hand screw 196. If several partitions are to be assembled side by side, an appropriate number of guides 120 should be mounted on cross channel 190, and each should be so positioned as to align the slots of the partition strips of one end of the machine with respect to the slots on the partition strips on the other end of the machine.

To adjust for strips of different thickness, one should do the following:

(a) Move each feed control bar 146 backwards or forwards on base bar 140 to adjust the bite of pushers 142.

(b) Adjust the pressure between each set of feed rolls 126 and 128 by means of hand wheels 135.

When these adjustments have been made and a stack of strips 15 have been provided at each feed assembly, the machine is ready for operation, as described above. It should be noted that wide variations in the speed of operation may interfere with the synchronization of microswitch 130, and such interferences can be offset by turning set screw 198 to adjust the height of each microswitch on the frame.

General considerations

It will be understood that numerous changes in this preferred construction can be made by those skilled in the art without departing from the scope of this invention. For example, the conveyors may be of unequal length, so long as proper synchronization is maintained. The operative runs of the conveyors could be horizontal as vertical, or a combination of the two, or at any angle in between. While there are numerous advantages of using the particular feed assembly illustrated in the drawings, it is of course possible to substitute other entirely separate feed mechanisms which may be known in the prior art or may be invented at a later date.

It will also be understood that the cam tracks for moving the racks 26 and 28 at the assembly station may be replaced by solid cams, each having a face adapted for a particular size of partition strip. It is also possible to abolish the cam system and replace it with mechanical, electric or hydraulic equipment for moving the racks into and out of assembly position; and similar means can be used for performing the stripping operation.

Other changes and modifications of a similar nature will be obvious to those skilled in the art.

I claim:

1. A feed bar adapted for reciprocal movement for feeding flat elements from the bottom of a stack comprising a laterally reciprocating bar provided with a plurality of spaced pushers on the forward edge thereof, a plurality of bite-controlling fingers extending forwardly from said bar through the spaces between said pushers, and means for shifting the relative lateral positions of said fingers and pushers, said pushers having a thickness of about the thickness of the thickest element to be fed, and said fingers defining an inclined plane of no substantial thickness at the forward end and of a thickness substantially equal to the thickness of the pushers at the rear end whereby shifting the position of said fingers provides a control for the effective height of said pushers.

2. A feed bar assembly adapted for reciprocal movement as in feeding relatively thick paper strips from the bottom of a stack comprising a table provided with a plurality of grooves extending in the direction of reciprocation, an elongated base adapted to be laterally reciprocated on said table, a plurality of abutment members aligned in spaced relationship on the forward edge of said base between said grooves, an elongated control bar positioned on said base, a plurality of bite-controlling fingers extending forwardly from said control bar and into said grooves, and means for shifting the control bar laterally on the base bar to a plurality of positions, said abutment members having a thickness at least as great as the thickness of the thickest blank to be fed, and the top of said fingers defining an inclined plane extending into said grooves at the forward end and of a height substantially equal to the thickness of the abutment members at the rear end whereby shifting the position of said control bar and fingers provides a control for the effective height of said abutment members.

3. A feed bar assembly adapted for reciprocal movement as in feeding box blanks from the bottom of a stack comprising an elongated feed bar base adapted to be laterally reciprocated, a plurality of abutment members aligned in spaced relationship on the forward edge of said base, an elongated control bar positioned on said base, a plurality of bite-controlling fingers extending forwardly from said control bar through the spaces between said abutment members, and means for shifting the control bar on the base bar to a plurality of positions rearwardly and forwardly thereof, said abutment members having a thickness at least as great as the thickness of the thickest blank to be fed, and said fingers defining an inclined plane of no substantial thickness at the forward end and of a thickness substantially equal to the thickness of the abutment members at the rear end whereby shifting the position of said control bar and fingers provides a control for the effective height of said abutment members.

4. A feed assembly for a partition-assembling device wherein strips are to be fed to moving strip holders comprising a feed table, guides on said table for defining a stack holder, a reciprocating feed bar on said table for moving single units forwardly from the bottom of the stack, a pair of continuously driven high-speed delivery rolls positioned at the forward portion of said table for receiving single units from said feed bar and delivering them to the desired position, a solenoid for moving said reciprocating bar forward, a second solenoid for retracting said reciprocating bar, and a switch actuated by a strip holder reaching a feed position, said switch having a first position for actuating said first solenoid and a second position for operating said second solenoid whereby feeding is accomplished instantaneously upon the signal at said switch.

5. A feed assembly for a partition-assembling device and the like comprising a feed table, guides on said table for defining a stack holder, a reciprocating feed bar on said table for moving single units forwardly from the bottom of the stack, a pair of high-speed delivery rolls positioned at the forward portion of said table for receiving single units from said feed bar and delivering them to the desired position, a solenoid for moving said reciprocating bar forward, a second solenoid for retracting said reciprocating bar, a single armature having one portion operatively associated with the first solenoid, one portion operatively associated with the second solenoid and a rigid link connecting it with said bar, and a switch responsive to the need for a unit to be fed, said switch having a first position for actuating said first solenoid and a second position for operating said second solenoid whereby feeding is accomplished instantaneously upon the signal at said switch.

6. A feed assembly for a partition-assembling device and the like comprising a feed table, guides on said table for defining a stack holder, a reciprocating feed bar on said table for moving single units forwardly from the bottom of the stack, a pair of continuously driven high-speed delivery rolls positioned at the forward portion of said table for receiving single units from said feed bar and delivering them to the desired position, a solenoid for moving said reciprocating bar forward, a second solenoid for retracting said reciprocating bar, means operatively associating said bar and said solenoids, and a switch responsive to the need for a unit to be fed, said switch having a first position for actuating said first solenoid and a second position for operating said second solenoid whereby feeding is accomplished instantaneously upon the signal at said switch.

7. A feed assembly for a partition-assembling device having strip holders moving in a single path past the feed assembly, comprising a frame mounting a feed table, a fixed guide on said table for defining part of a stack holder, a laterally and longitudinally movable guide for defining another part of the stack holder, a reciprocating feed bar on said table for moving single units forwardly from the bottom of the stack, a pair of high-speed delivery rolls positioned at the forward portion of said table for receiving single units from said feed bar and delivering them to the desired position, means for moving the effective position of the reciprocating bar longitudinally with respect to said feed rolls, and means for moving the entire feed assembly longitudinally on said frame with respect to said strip holder path.

8. A feed assembly for a partition-assembling device and the like comprising a feed table, guides on said table for defining a stack holder, a reciprocating feed bar on said table for moving single units forwardly from the bottom of the stack, a solenoid for moving said reciprocating bar forward, a second solenoid for retracting said reciprocating bar, a single armature having one portion operatively associated with the first solenoid, one portion operatively associated with the second solenoid and a rigid link connecting it with said bar, and a switch responsive to the need for a unit to be fed, said switch having a first position for actuating said first solenoid and a second position for operating said second solenoid whereby feeding is accomplished instantaneously upon the signal at said switch.

References Cited in the file of this patent

UNITED STATES PATENTS

| 1,514,110 | Still | Nov. 4, 1924 |
| 1,669,015 | Oliver | May 8, 1928 |
| 1,763,039 | Ford | June 10, 1930 |
| 2,158,505 | Horgan | May 16, 1939 |
| 2,540,162 | Bowersock | Feb. 6, 1951 |